(12) United States Patent
Boyd et al.

(10) Patent No.: US 8,172,239 B1
(45) Date of Patent: May 8, 2012

(54) COLLAPSIBLE SHOPPING CART SYSTEM

(76) Inventors: Cherylene Boyd, Ellenton, FL (US);
Lawrence J. Boyd, Ellenton, FL (US)

( * ) Notice: Subject to any disclaimer, the term of this patent is extended or adjusted under 35 U.S.C. 154(b) by 426 days.

(21) Appl. No.: 12/459,444

(22) Filed: Jul. 1, 2009

(51) Int. Cl.
*B62D 39/00* (2006.01)

(52) U.S. Cl. ............. 280/33.992; 280/47.26; 280/47.18

(58) Field of Classification Search ............. 280/33.991, 280/3.995, 33.996, 33.998, 639, 643, 641, 280/651, 652, 645, 649, 638, 47.371, 47.33, 280/47.18, 47.26
See application file for complete search history.

(56) References Cited

U.S. PATENT DOCUMENTS

| | | | | |
|---|---|---|---|---|
| 2,564,939 A | * | 8/1951 | Weast | 280/652 |
| 2,891,803 A | * | 6/1959 | Mintz | 280/645 |
| 3,235,038 A | * | 2/1966 | Nesslinger | 211/195 |
| 4,611,945 A | | 9/1986 | Diego | |
| 4,953,878 A | * | 9/1990 | Sbragia | 280/30 |
| 5,745,954 A | * | 5/1998 | Shogan et al. | 16/343 |
| 5,915,722 A | * | 6/1999 | Thrasher et al. | 280/649 |
| 5,915,723 A | * | 6/1999 | Austin | 280/651 |
| 6,042,128 A | | 3/2000 | Dinkins | |
| 6,045,150 A | * | 4/2000 | Al-Toukhi | 280/651 |
| 6,073,943 A | * | 6/2000 | Serrault | 280/47.26 |
| 6,371,873 B1 | * | 4/2002 | Wang | 473/478 |
| 7,731,221 B2 | * | 6/2010 | Bess | 280/651 |

* cited by examiner

*Primary Examiner* — Hau Phan

(57) ABSTRACT

A shopping cart has upper, lower and intermediate frames. The frames have a front, rear, sides, two front corners and two rear corners. The lower and intermediate frames each have a rigid screen. Four upper posts couple the front corners of the upper and intermediate frames. Two rear posts couple the rear corners of the upper and intermediate frames. Two lower posts couple the rear corners of the intermediate and lower frames. Each of the posts has a midpoint with a hinge dividing each post into an upper segment and a lower segment. Each hinge is adapted to be pivoted between a linear orientation and a non-linear orientation. In the linear orientation the segments of the posts are perpendicular to the frames and the shopping cart is in an expanded orientation. In the non-linear orientation the segments the post are parallel with the frames and the shopping cart is in a contracted orientation.

9 Claims, 4 Drawing Sheets

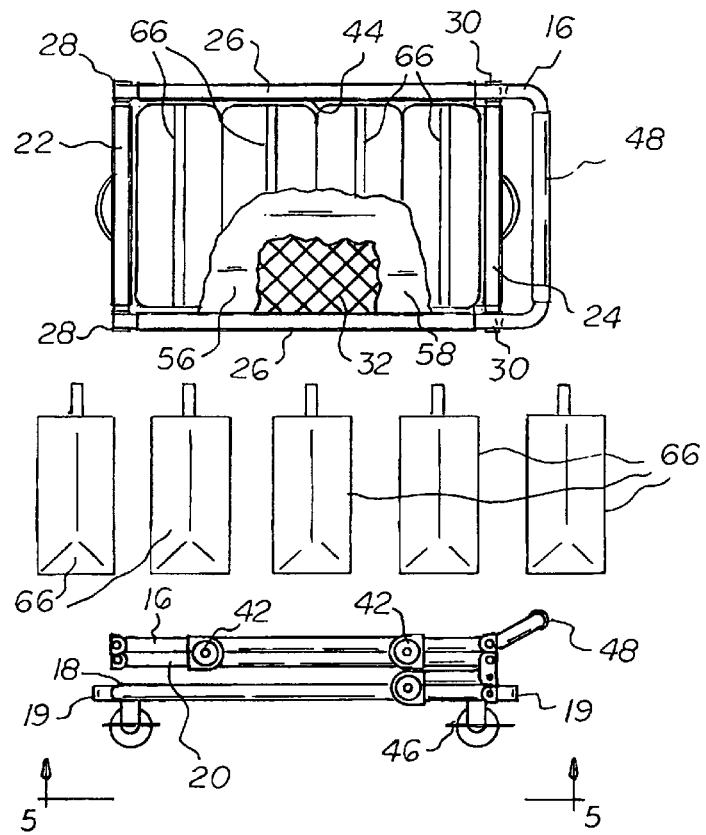

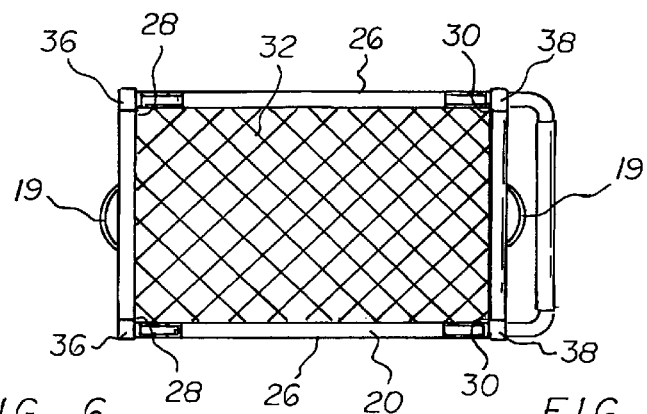
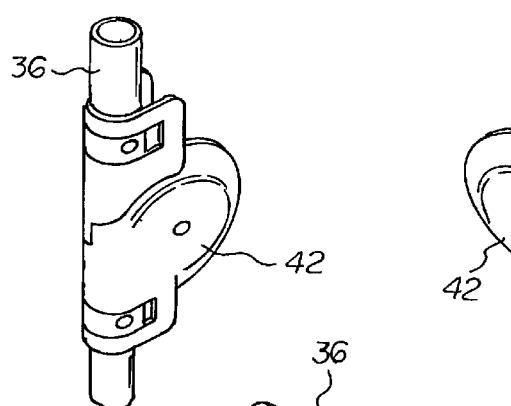
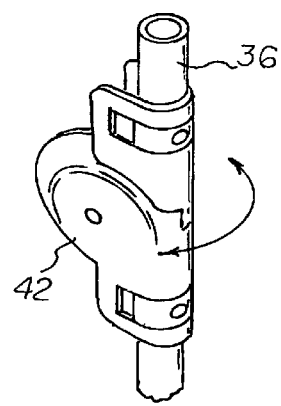
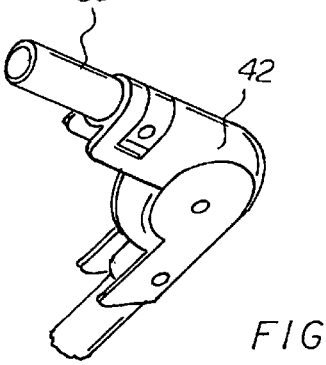

COLLAPSIBLE SHOPPING CART SYSTEM

BACKGROUND OF THE INVENTION

1. Field of the Invention

The present invention relates to a collapsible shopping cart system and more particularly pertains to converting a shopping cart between an expanded operative orientation with shopping bags in place and a collapsed orientation with shopping bags removed, in a safe, convenient and economical manner.

2. Description of the Prior Art

The use of collapsible carts of known designs and configurations is known in the prior art. More specifically, collapsible carts of known designs and configurations previously devised and utilized for the purpose of collapsing a cart through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,611,945 issued Sep. 16, 1986 to Diego relates to an Articulated Joint for Folding Tubular Sections and U.S. Pat. No. 6,042,128 issued Mar. 28, 2000 to Dinkins relates to a Collapsible Shopping Cart.

While these devices fulfill their respective, particular objectives and requirements, the aforementioned patents do not describe a collapsible shopping cart system that allows for converting a shopping cart between an expanded operative orientation with shopping bags in place and a collapsed orientation with shopping bags removed, in a safe, convenient and economical manner.

In this respect, the collapsible shopping cart system according to the present invention substantially departs from the conventional concepts and designs of the prior art, and in doing so provides an apparatus primarily developed for the purpose of converting a shopping cart between an expanded operative orientation with shopping bags in place and a collapsed orientation with shopping bags removed, in a safe, convenient and economical manner.

Therefore, it can be appreciated that there exists a continuing need for a new and improved collapsible shopping cart system which can be used for converting a shopping cart between an expanded operative orientation with shopping bags in place and a collapsed orientation with shopping bags removed, in a safe, convenient and economical manner. In this regard, the present invention substantially fulfills this need.

SUMMARY OF THE INVENTION

In view of the foregoing disadvantages inherent in the known types of collapsible carts of known designs and configurations now present in the prior art, the present invention provides an improved collapsible shopping cart system. As such, the general purpose of the present invention, which will be described subsequently in greater detail, is to provide a new and improved collapsible shopping cart system and method which has all the advantages of the prior art and none of the disadvantages.

To attain this, the present invention essentially comprises a collapsible shopping cart system. First provided is a shopping cart. The shopping cart has an upper frame. The shopping cart has a lower frame. The shopping cart has an intermediate frame. Each of the frames is of a similar construction. The similar construction is a rectangular configuration. Each frame has a front. Each frame has a rear. Each frame has opposed sides. Each frame has two front corners. Each frame has two rear corners. The lower and intermediate frames each have a rigid screen. A pair of similarly shaped handles are provided on the lower frame. One of the pair of handles is on the front and one of the pair is on the back of the lower frame.

Four similarly configured upper posts are provided. The upper posts include two front posts. The front posts couple the front corners of the upper and intermediate frames. The upper posts include two rear posts. The rear posts couple the rear corners of the upper and intermediate frames. Two similarly configured lower posts are provided. The lower posts couple the rear corners of the intermediate and lower frames. Each lower post has a common length. Each upper post has a common length. The common length of the upper posts is greater than the length of the lower posts. Each of the posts has a midpoint. Each of the posts has a hinge. The hinge is provided at the midpoint of each post. Each hinge divides each post into an upper segment and a lower segment. Each hinge is adapted to be pivoted to a linear orientation. In this manner the segments of each post are axially aligned essentially perpendicular to the frames and the shopping cart is in an expanded orientation for use with the upper and intermediate frames. In this manner a basket is defined. The basket has a length and a width and a depth. Each hinge is adapted to be pivoted to a non-linear orientation. In this manner the segments of each post are essentially parallel with the frames and the shopping cart is in a contracted orientation for storage with the upper and lower frames closely spaced adjacent to the intermediate frame. Each hinge is rotatable about its axis. In this manner each hinge may be converting between a locked condition and an unlocked condition. For construction and operation of the hinge, note the aforementioned patent to Dinkins. The subject matter of which is incorporated herein by reference.

A wheel extending downwardly from the lower frame adjacent to each of the four corners is next provided. A user controlled lock is provided for at least one of the wheels.

Provided next is a handle. The handle is located between the sides of the upper frame. The handle extends upwardly and rearwardly from the basket.

A child's seat is provided. The child's seat is adjustably positioned within the basket. The child's seat is provided adjacent to the rear of the upper frame.

Further provided is a flexible fabric liner. The liner is removably positioned within the basket. The liner has a floor. The floor is positionable upon the screen of the intermediate frame. The liner has walls. The walls extend upwardly from the floor. The walls have upper edges. The upper edges have snaps. In this manner the liner is separably coupled to the upper frame.

Provided last is a plurality of bags. Each of the bags has a width and a depth. The width and depth of the bags is essentially equal to the width and depth of the basket.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved collapsible shopping cart system which has all of the advantages of the prior art collapsible carts of known designs and configurations and none of the disadvantages.

It is another object of the present invention to provide a new and improved collapsible shopping cart system which may be easily and efficiently manufactured and marketed.

It is further object of the present invention to provide a new and improved collapsible shopping cart system which is of durable and reliable constructions.

An even further object of the present invention is to provide a new and improved collapsible shopping cart system which is susceptible of a low cost of manufacture with regard to both materials and labor, and which accordingly is then susceptible of low prices of sale to the consuming public, thereby making such collapsible shopping cart system economically available to the buying public.

Even still another object of the present invention is to provide a collapsible shopping cart system for converting a shopping cart between an expanded operative orientation with shopping bags in place and a collapsed orientation with shopping bags removed, in a safe, convenient and economical manner.

Lastly, it is an object of the present invention to provide a new and improved collapsible shopping cart system. A shopping cart has upper, lower and intermediate frames. The frames have a front, rear, sides, two front corners and two rear corners. The lower and intermediate frames each have a rigid screen. Four upper posts couple the front corners of the upper and intermediate frames. Two rear posts couple the rear corners of the upper and intermediate frames. Two lower posts couple the rear corners of the intermediate and lower frames. Each of the posts has a midpoint with a hinge dividing each post into an upper segment and a lower segment. Each hinge is adapted to be pivoted between a linear orientation and a non-linear orientation. In the linear orientation the segments of the posts are perpendicular to the frames and the shopping cart is in an expanded orientation. In the non-linear orientation the segments the post are parallel with the frames and the shopping cart is in a contracted orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a plan view of the system taken along line -3 of FIG. 1.

FIG. 4 is an exploded view of the system but with the shopping cart in a collapsed orientation and with the shopping bags removed.

FIG. 5 is a plan view of the system but with the liner removed.

FIGS. 6 through 8 are perspective illustrations of a hinge in various stages of orientation.

The same reference numerals refer to the same parts throughout the various Figures.

DESCRIPTION OF THE PREFERRED EMBODIMENT

Figure 1:
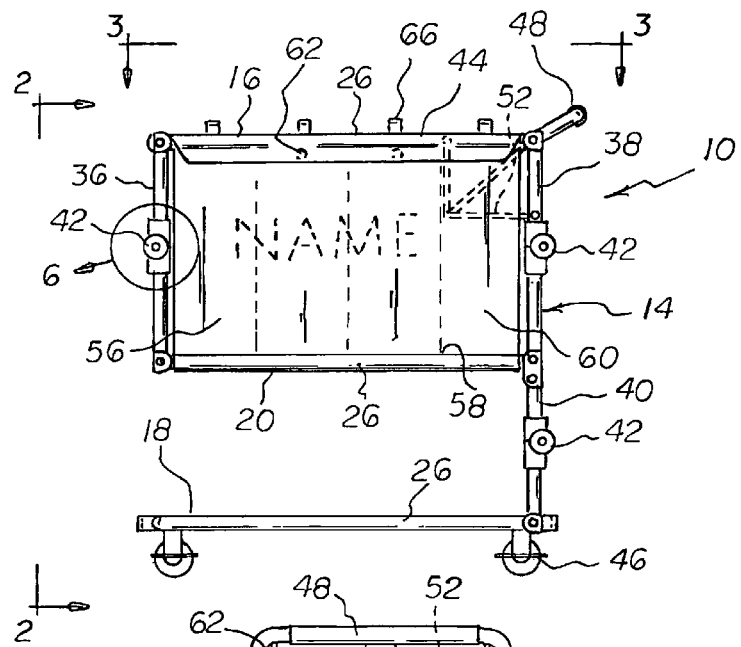
FIG. 1 is a side elevational view of a collapsible shopping cart system constructed in accordance with the principles of the invention.
Figure 2:
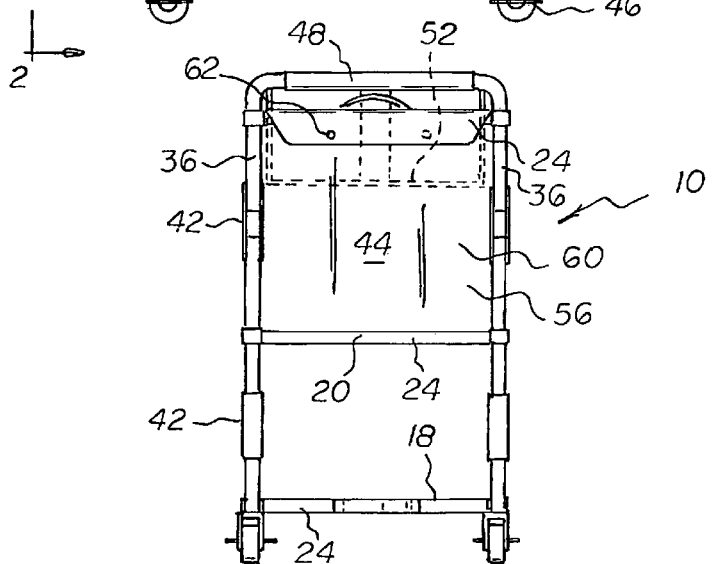
FIG. 2 is a front elevational view of the system taken along line 2-2 of FIG. 1.

With reference now to the drawings, and in particular to FIG. 1 thereof, the preferred embodiment of the new and improved collapsible shopping cart system embodying the principles and concepts of the present invention and generally designated by the reference numeral 10 will be described.

The present invention, the collapsible shopping cart system 10 is comprised of a plurality of components. Such components in their broadest context include a shopping cart and four similarly configured upper posts. Such components are individually configured and correlated with respect to each other so as to attain the desired objective.

First provided is a shopping cart 14. The shopping cart has an upper frame 16. The shopping cart has a lower frame 18. The shopping cart has an intermediate frame 20. Each of the frames is of a similar construction. The similar construction is a rectangular configuration. Each frame has a front 22. Each frame has a rear 24. Each frame has opposed sides 26. Each frame has two front corners 28. Each frame has two rear corners 30. The lower and intermediate frames each have a rigid screen 32. A pair of similarly shaped handles 19 are provided on the lower frame. One of the pair of handles is on the front and one of the pair is on the back of the lower frame. The similarly shaped handles facilitate lifting of the system when in the collapsed orientation.

Four similarly configured upper posts are provided. The upper posts include two front posts 36. The front posts couple the front corners of the upper and intermediate frames. The upper posts include two rear posts 38. The rear posts couple the rear corners of the upper and intermediate frames. Two similarly configured lower posts 40 are provided. The lower posts couple the rear corners of the intermediate and lower frames. Each lower post has a common length. Each upper post has a common length. The common length of the upper posts is greater than the length of the lower posts. Each of the posts has a midpoint. Each of the posts has a hinge 42. The hinge is provided at the midpoint of each post. Each hinge divides each post into an upper segment and a lower segment. Each hinge is adapted to be pivoted to a linear orientation. In this manner the segments of each post are axially aligned essentially perpendicular to the frames and the shopping cart is in an expanded orientation for use with the upper and intermediate frames. In this manner a basket 44 is defined. The basket has a length and a width and a depth. Each hinge is adapted to be pivoted to a non-linear orientation. In this manner the segments of each post are essentially parallel with the frames and the shopping cart is in a contracted orientation for storage with the upper and lower frames closely spaced adjacent to the intermediate frame. Each hinge is rotatable about its axis. In this manner each hinge may be converting between a locked condition and an unlocked condition. For construction and operation of the hinge, note the aforementioned patent to Dinkins. The subject matter of which is incorporated herein by reference.

A wheel extending downwardly from the lower frame adjacent to each of the four corners is next provided. The front wheels are preferably casters to increase the maneuverability of the cart. A user controlled lock 46 is provided for at least one of the wheels. Locking wheels prohibit unintended rolling around of the cart.

Provided next is a handle 48. The handle is located between the sides of the upper frame. The handle extends upwardly and rearwardly from the basket.

A child's seat 52 is provided. The child's seat is adjustably positioned within the basket. The child's seat is provided adjacent to the rear of the upper frame.

Further provided is a flexible fabric liner 56. The liner is removably positioned within the basket. The liner has a floor 58. The floor is positionable upon the screen of the intermediate frame. The liner has walls 60. The walls extend upwardly from the floor. The walls have upper edges. The upper edges have snaps 62. In this manner the liner is separably coupled to the upper frame.

Provided last is a plurality of bags 66. Each of the bags has a width and a depth. The width and depth of the bags is essentially equal to the width and depth of the basket.

Figure 9:
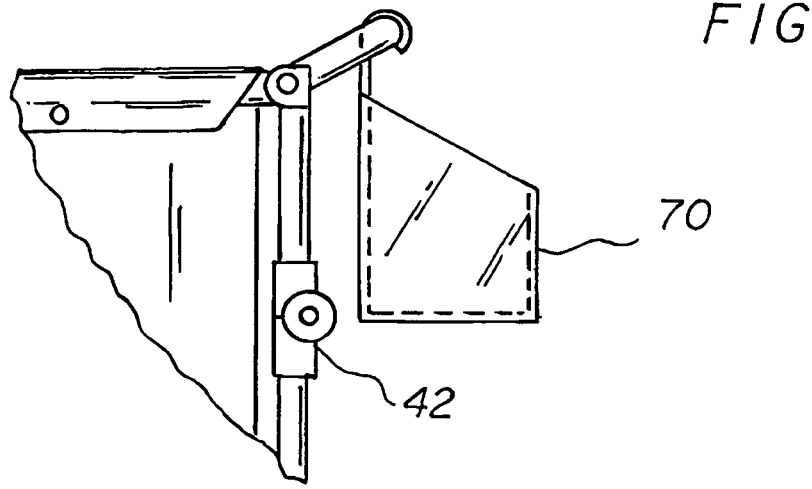
FIG. 9 is a side elevational view of a container as an optional feature of the invention.
Figure 10:
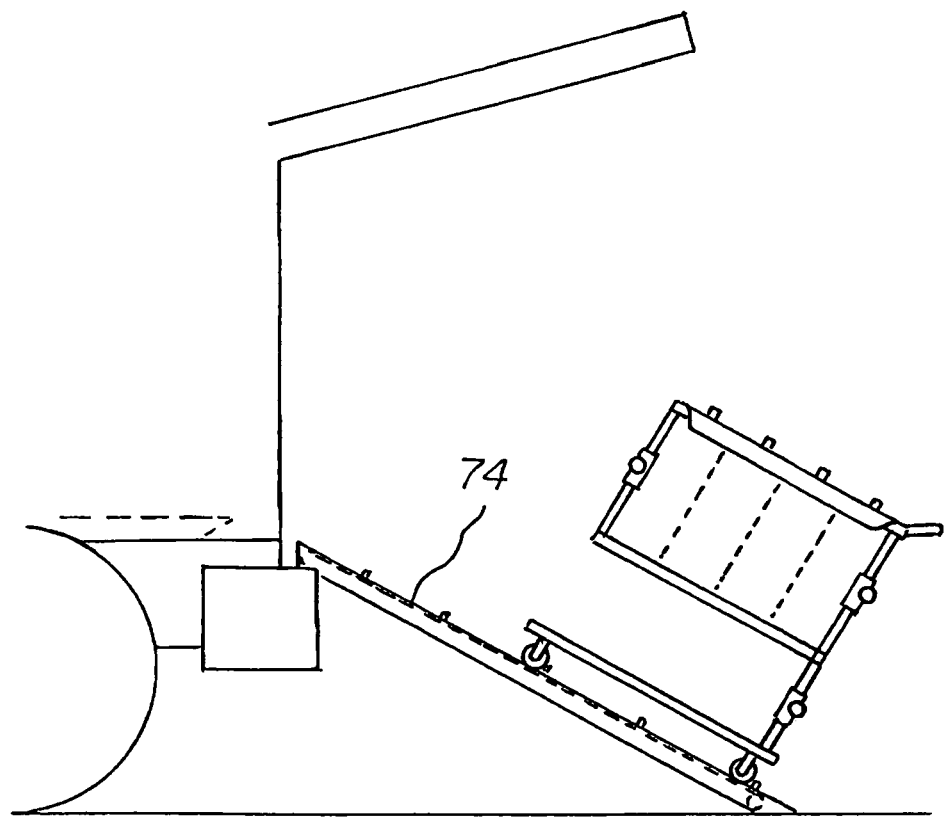
FIG. 10 is a side elevational view of a ramp as another optional feature of the invention.

Optional features are shown in FIGS. 9 and 10. FIG. 9 is a side elevational view of a container 70. The container is removably supported on the handle of the shopping cart. The container is for retaining coupons, shopping lists and the like. The ramp 74 of FIG. 10 is adapted to span the ground and a vehicle. As such, a shopping cart may be rolled into and from a vehicle at shopping time.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A collapsible shopping cart system comprising:
    a shopping cart including upper, lower and intermediate frames, each of the frames having a front, rear and sides, each frame having two front corners and two rear corners, the lower and intermediate frames each having a rigid screen; and
    four similarly configured upper posts including two front posts coupling the front corners of the upper and intermediate frames and two rear posts coupling the rear corners of the upper and intermediate frames, two similarly configured lower posts coupling the rear corners of the intermediate and lower frames, each of the posts having a midpoint with a hinge at the midpoint, each hinge dividing each post into an upper segment and a lower segment, each hinge adapted to be pivoted to a linear orientation wherein the segments of each post are axially aligned essentially perpendicular to the frames and the shopping cart is in an expanded orientation with the upper and intermediate frames defining a basket, each hinge adapted to be pivoted to a non-linear orientation wherein the segments of each post are essentially parallel with the frames and the shopping cart is in a contracted orientation.

2. The system as set forth in claim 1 wherein each hinge is adapted to be pivoted to a non-linear orientation wherein the segments of each post are essentially parallel with the frames and the shopping cart is in a contracted orientation for storage with the upper and lower frames closely spaced adjacent to the intermediate frame.

3. The system as set forth in claim 1 and further including a handle located between the sides of the upper frame and extending upwardly and rearwardly from the basket.

4. The system as set forth in claim 1 and further including a child's seat adjustably positioned within the basket and adjacent to the rear of the upper frame.

5. The system as set forth in claim 1 and further including a flexible fabric liner removably positioned within the basket, the liner having a floor positionable upon the screen of the intermediate frame, the liner having walls extending upwardly from the floor, the walls having upper edges with snaps for separably coupled the liner to the upper frame.

6. The system as set forth in claim 5 and further including a plurality of bags positionable within the liner.

7. The system as set forth in claim 1 and further including a container removably supported on the handle of the shopping cart.

8. The system as set forth in claim 1 and further including a ramp adapted to span the ground and a vehicle whereby the shopping cart may be rolled into and from a vehicle at shopping time.

9. A collapsible shopping cart system for converting a shopping cart between an expanded operative orientation with shopping bags in place and a collapsed orientation with shopping bags removed, the system comprising, in combination:
    the shopping cart including an upper frame, a lower frame and an intermediate frame, each of the frames being of a similar construction in a rectangular configuration with a front, a rear and opposed sides, each frame having two front corners and two rear corners, the lower and intermediate frames each having a rigid screen, a pair of similarly shaped handles, one on the front and one on the back of the lower frame;
    four similarly configured upper posts including two front posts coupling the front corners of the upper and intermediate frames and two rear posts coupling the rear corners of the upper and intermediate frames, two similarly configured lower posts coupling the rear corners of the intermediate and lower frames, each lower post having a common length and each upper post having a common length greater than the length of the lower posts, each of the posts having a midpoint with a hinge at the midpoint of each post, each hinge dividing each post into an upper segment and a lower segment, each hinge adapted to be pivoted to a linear orientation wherein the segments of each post are axially aligned essentially perpendicular to the frames and the shopping cart is in the expanded operative orientation for use with the upper and intermediate frames defining a basket, the basket having a length and a width and a depth, each hinge adapted to be pivoted to a non-linear orientation wherein the segments of each post are essentially parallel with the frames and the shopping cart is in a contracted orientation for storage with the upper and lower frames closely spaced adjacent to the intermediate frame, each hinge rotatable about its axis for converting between a locked condition and an unlocked condition;

a wheel extending downwardly from the lower frame adjacent to each of the four corners with a user controlled lock for at least one of the wheels;

a handle located between the sides of the upper frame and extending upwardly and rearwardly from the basket;

a child's seat adjustably positioned within the basket and adjacent to the rear of the upper frame;

a flexible fabric liner removably positioned within the basket, the liner having a floor positionable upon the screen of the intermediate frame, the liner having walls extending upwardly from the floor, the walls having upper edges with snaps for separably coupled the liner to the upper frame; and a plurality of bags, each of the bags having a width and a depth essentially equal to the width and depth of the basket.

* * * * *